(12) United States Patent
Shiratori et al.

(10) Patent No.: US 11,821,059 B2
(45) Date of Patent: Nov. 21, 2023

(54) NI-BASED ALLOY, NI-BASED ALLOY POWDER, NI-BASED ALLOY MEMBER, AND PRODUCT INCLUDING NI-BASED ALLOY MEMBER

(71) Applicant: Proterial, Ltd., Tokyo (JP)

(72) Inventors: Hiroshi Shiratori, Tokyo (JP); Kazuya Shinagawa, Tokyo (JP); Shuho Koseki, Tokyo (JP); Yasuhiko Otsubo, Tokyo (JP); Kousuke Kuwabara, Tokyo (JP)

(73) Assignee: Proterial, Ltd., Tokyo (JP)

( * ) Notice: Subject to any disclaimer, the term of this patent is extended or adjusted under 35 U.S.C. 154(b) by 195 days.

(21) Appl. No.: 17/607,515

(22) PCT Filed: Sep. 4, 2020

(86) PCT No.: PCT/JP2020/033557
§ 371 (c)(1),
(2) Date: Oct. 29, 2021

(87) PCT Pub. No.: WO2021/045183
PCT Pub. Date: Mar. 11, 2021

(65) Prior Publication Data
US 2022/0213577 A1 Jul. 7, 2022

(30) Foreign Application Priority Data
Sep. 6, 2019 (JP) .................. 2019-162768

(51) Int. Cl.
*C22C 19/05* (2006.01)
*B33Y 70/00* (2020.01)
*B22F 1/00* (2022.01)

(52) U.S. Cl.
CPC .............. *C22C 19/055* (2013.01); *B22F 1/00* (2013.01); *B33Y 70/00* (2014.12); *C22C 19/056* (2013.01); *B22F 2301/15* (2013.01); *B22F 2304/10* (2013.01)

(58) Field of Classification Search
CPC ......... C22F 1/10; C22C 30/00; C22C 19/057; C22C 19/056; C22C 19/055
See application file for complete search history.

(56) References Cited

U.S. PATENT DOCUMENTS

| | | | |
|---|---|---|---|
| 5,100,616 A | 3/1992 | Kawasaki et al. | |
| 6,162,551 A | 12/2000 | Watanabe | |
| 2016/0033444 A1 | 11/2016 | Sugahara | |
| 2020/0206816 A1 | 7/2020 | Daigo et al. | |

FOREIGN PATENT DOCUMENTS

| | | |
|---|---|---|
| CN | 101451225 A | 6/2009 |
| CN | 102676882 A | 9/2012 |
| CN | 106987757 A | 7/2017 |
| EP | 1270754 A1 | 1/2003 |
| JP | H02-205650 A | 8/1990 |
| JP | H04-337047 A | 11/1992 |
| JP | H05-132734 A | 5/1993 |
| JP | H08-134570 A | 5/1996 |
| JP | H11-080868 A | 3/1999 |
| JP | 2015-160965 A | 9/2015 |
| JP | 2015-168840 A | 9/2015 |
| WO | 2019/049594 A1 | 3/2019 |

OTHER PUBLICATIONS

International Search Report, PCT/JP2020/033557, dated Oct. 27, 2020 (2 pages).
European Search Report dated Dec. 14, 2022 for European Patent Application No. 20860040.3.
Chinese Office Action dated Mar. 10, 2022 for Chinese Patent Application No. 202080032725.2.

*Primary Examiner* — Jessee R Roe
(74) *Attorney, Agent, or Firm* — Volpe Koenig

(57) ABSTRACT

Provided are a Ni-based alloy capable of being melted and solidified and excellent in corrosion resistance and abrasion resistance, a Ni-based alloy powder, a Ni-based alloy member, and a product including a Ni-based alloy member. The Ni-based alloy excellent in corrosion resistance and abrasion resistance includes, by mass %: Cr: 8.5% to 23.0%; Mo: 8.5% to 27.0%; Ta: 0.5% to 2.5%; W: 15.0 to 51.0%; and C: 1.0 to 3.5%, the balance being Ni and unavoidable impurities, in which the mass ratios Ni:Cr:Mo of Ni, Cr and Mo are 2.5 to 3.5:1:1.0 to 1.5.

18 Claims, 6 Drawing Sheets w: SECONDARY ARM INTERVAL

FIG. 5A  WHITE DOT FRAME: ENLARGED POSITION  FIG. 5B
WHITE FRAME: EDS ANALYSIS POSITION

WHITE DOT FRAME INDICATES ENLARGED POSITION
WHITE FRAME INDICATES EDS ANALYSIS POSITION

NI-BASED ALLOY, NI-BASED ALLOY POWDER, NI-BASED ALLOY MEMBER, AND PRODUCT INCLUDING NI-BASED ALLOY MEMBER

TECHNICAL FIELD

The present invention relates to a Ni-based alloy particularly excellent in corrosion resistance and abrasion resistance, a Ni-based alloy powder, a Ni-based alloy member, and a product including a Ni-based alloy member.

BACKGROUND ART

Members such as a screw and a cylinder for injection molding are required to have corrosion resistance for enduring corrosive gas such as sulfide gas generated at the time of melting a resin. In addition, at the time of molding a fiber-reinforced plastic in which glass fibers or carbon fibers are added, abrasion resistance is required.

As an alloy excellent in corrosion resistance, there is known a Ni-based alloy containing Cr and Mo (described as Ni—Cr—Mo-based alloy) described in Patent Document 1. However, this alloy has a hardness HRC on the order of 20 to 30, and, for use in the aforementioned members, it is necessary to further enhance the abrasion resistance.

On the other hand, by dispersing hard particles in the Ni—Cr—Mo-based alloy, it is possible to enhance abrasion resistance. For example, Patent Document 2 discloses a hard alloy in which a hard phase consisting mainly of a boride as well as a carbide or a nitride such as WC, TiC, TiN, and Tac are dispersed in a Ni—Cr—Mo-based alloy.

PRIOR ART DOCUMENTS

Patent Documents

Patent Document 1: JP-2015-160965-A
Patent Document 2: JP-1996-134570-A

SUMMARY OF THE INVENTION

Problem to be Solved by the Invention

By dispersing a carbide or a boride in the Ni—Cr—Mo-based alloy as aforementioned, abrasion resistance is enhanced. However, many of the Ni—Cr—Mo-based alloys in which a carbide such as WC is dispersed, inclusive of the above document, are produced by sintering or HIP, and, therefore, they are low in the degree of freedom in shape and would be limited in use.

In view of this, it is an object of the present invention to provide a Ni-based alloy capable of being produced by melting and solidification, high in the degree of freedom in shape and being excellent in corrosion resistance, a Ni-based alloy powder, a Ni-based alloy member, and a product including the same.

Means for Solving the Problem

The present inventor, in a carbide dispersion type Ni-based alloy (hereinafter sometimes referred to simply as Ni-based alloy) in which W and C are added to a Ni—Cr—Mo-based alloy, by optimizing the addition amounts of W and C and the component ratios of Ni and Cr and Mo, found out an alloy composition capable of producing an alloy ingot by melting and solidification and producing by laminate shaping and being excellent in corrosion resistance and abrasion resistance.

One mode of a Ni-based alloy of the present invention includes, by mass %: Cr: 8.5% to 23.0%; Mo: 8.5% to 27.0%; Ta: 0.5% to 2.5%; W: 15.0% to 51.0%; and C: 1.0% to 3.5%, the balance being Ni and unavoidable impurities, in which the mass ratios Ni:Cr:Mo of Ni, Cr, and Mo are 2.5 to 3.5:1:1.0 to 1.5.

In addition, in one mode of the Ni-based alloy of the present invention, it is preferable that the atomic ratio W:C of W and C in the Ni-based alloy is 1:0.9 to 1.1.

Besides, one mode of the Ni-Based alloy of the present invention preferably includes a dendrite structure and a bonding phase surrounding the dendrite structure.

In addition, in one mode of the Ni-based alloy of the present invention, it is preferable that the dendrite structure has a primary arm, and a secondary arm projecting from the primary arm, and the interval between the adjacent secondary arms is equal to or less than 5.0 μm.

Besides, in one mode of the Ni-based alloy of the present invention, it is preferable that a region where Cr/W ratio is different is present in the dendrite structure.

In addition, in one mode of the Ni-based alloy of the present invention, it is preferable that a eutectic carbide with a high Cr/W ratio in the dendrite structure is present in a peripheral portion as compared to a central portion of the dendritic structure.

Besides, one mode of a Ni-based alloy powder of the present invention for achieving the above object includes, by mass %: Cr: 8.5% to 23.0%; Mo: 8.5% to 27.0%; Ta: 0.5% to 2.5%; W: 15.0% to 51.0%; and C: 1.0% to 3.5%, the balance being Ni and unavoidable impurities, in which the mass ratios Ni:Cr:Mo of Ni, Cr, and Mo are 2.5 to 3.5:1:1.0 to 1.5.

In addition, in one mode of the Ni-based alloy powder of the present invention, it is preferable that the atomic ratio W:C of W and C in the Ni-based alloy powder is 1:0.9 to 1.1.

Besides, in one mode of the Ni-based alloy powder of the present invention, it is preferable that the average particle diameter is 5 to 150 μm.

In addition, one mode of the Ni-based alloy powder of the present invention preferably is a mixed powder, a granulated powder or an atomized powder.

Further, one mode of a Ni-based alloy member of the present invention for achieving the above object includes, by mass %: Cr: 8.5% to 23.0%; Mo: 8.5% to 27.0%; Ta: 0.5% to 2.5%; W: 15.0% to 51.0%; and C: 1.0% to 3.5%, the balance being Ni and unavoidable impurities, in which the mass ratios Ni:Cr:Mo of Ni, Cr, and Mo are 2.5 to 3.5:1:1.0 to 1.5.

Besides, in one mode of the Ni-based alloy member of the present invention, it is preferable that the atomic ratio W:C of W and C is 1:0.9 to 1.1.

In addition, one mode of the Ni-based alloy member preferably has a dendrite structure.

Besides, in one mode of the Ni-based alloy member of the present invention, it is preferable that the dendrite structure has a primary arm, and a secondary arm projecting from the primary arm, and the interval between the adjacent secondary arms is equal to or less than 5.0 μm.

In addition, in one mode of the Ni-based alloy member of the present invention, it is preferable that a region where a Cr/W ratio is different is present in the dendrite structure.

Besides, in one mode of the Ni-based alloy member of the present invention, it is preferable that a eutectic carbide with a high Cr/W ratio in the dendrite structure is present in a peripheral portion as compared to a central portion of the dendritic structure.

In addition, for achieving the above object, the present invention provides a product including the aforementioned Ni-based alloy member.

Besides, in one mode including the Ni-based alloy member of the present invention, it is preferable that the product is any one of an injection molding screw, any of various kinds of pipings for transport of a corrosive gas or a corrosive product, and a bit of an excavator.

Advantages of the Invention

According to the present invention, it is possible to provide a Ni-based alloy which is capable of being melted and solidified, has a degree of freedom in shape, and is excellent in corrosion resistance and abrasion resistance, a Ni-based alloy powder, a Ni-based alloy member, and a product including the same.

Other objects, configurations, and advantageous effects than the aforementioned will be made clear by the following description of embodiments.

BRIEF DESCRIPTION OF THE DRAWINGS

FIG. 5 is TEM images (magnification: 3,000 times, 10,000 times) of an alloy melted and cast by use of the powder of Example 3.

MODES FOR CARRYING OUT THE INVENTION

<Ni-Based Alloy>

Figure 1:
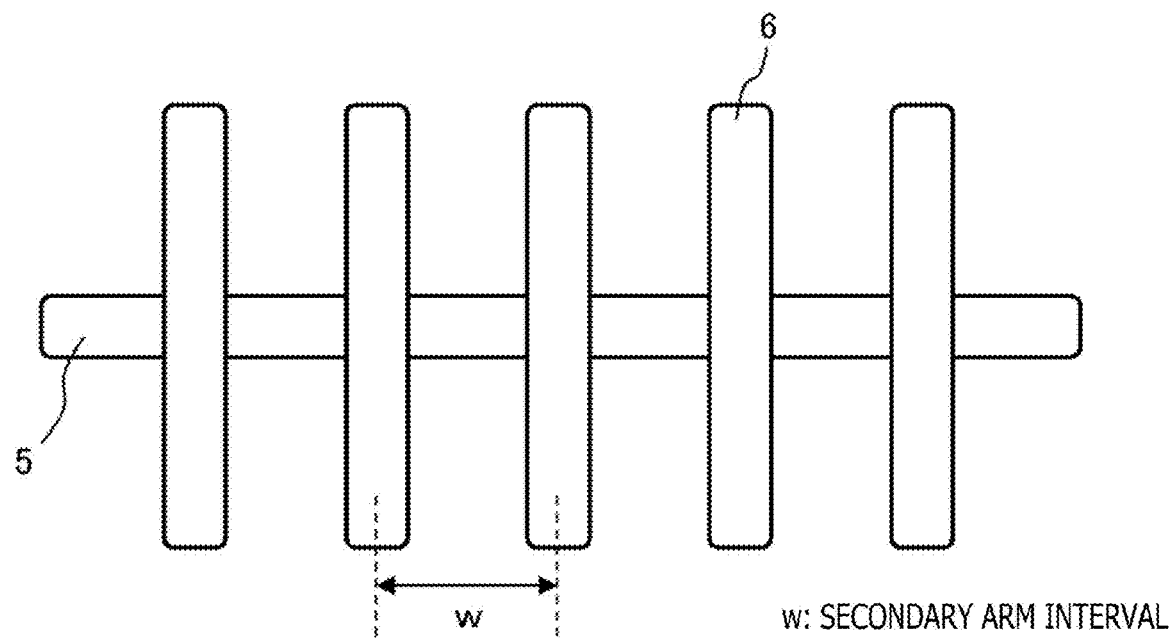
FIG. 1 is a schematic view of a dendrite structure of a Ni-based alloy of the present invention.

The present embodiment relates to, of Ni-based alloys in which Ni is the highest ratio in the atomic ratios in the metallic phase, a carbide dispersion type Ni-based alloy obtained by adding W and C to a Ni—Cr—Mo-based alloy. The present inventor has made extensive and intensive investigations of the alloy composition of this Ni-based alloy for securing both high corrosion resistance and high abrasion resistance and for applying a manufacturing method having a high degree of freedom in shape by melting and solidification.

As a manufacturing method including melting and solidification, there is an additive manufacturing method in addition to a melting and casting method. For enabling the additive manufacturing method, it is important to optimize the contents of W and C and the compositional ratio of Ni, Cr, and Mo, and melting is impossible when the balance of them is lost. Therefore, by optimizing the addition amounts of W and C and the compositional ratios of Ni, Cr, and Mo, the additive manufacturing method has been made applicable. Note that this Ni-based alloy is referred to as "Ni-based" in the present invention since the amount of Ni is in the highest ratio when the component elements of the alloy are expressed in atomic ratios.

The contents of component elements of the Ni-based alloy of the present invention (hereinafter referred also to simply as "alloy") will be described in detail. Note that the content of an element is expressed in mass %, and, for example, "8.5% to 23.0%" means equal to or more than 8.5 mass % and equal to or less than 23.0 mass %.

1. Components of Alloy

[Cr: 8.5% to 23.0%]

Cr has the effect of enhancing corrosion resistance against acids such as hydrochloric acid, sulfuric acid, and hydrofluoric acid. For obtaining a corrosion resistance enhancing effect, it is necessary to contain 8.5% or more of Cr, but when Cr content increases, a BCC phase and intermetallic compounds are formed, to lower corrosion resistance and toughness. Therefore, Cr content is 8.5% to 23.0%. The Cr content is preferably 9.5% to 15.0%, more preferably 10.5% to 13.5%.

[Mo: 8.5% to 27.0%]

Like Cr, Mo also enhances corrosion resistance against acids such as hydrochloric acid, sulfuric acid, and hydrofluoric acid. Although Cr alone contribute to enhancement of corrosion resistance, by combining Cr with Mo, a passivation film with more excellent corrosion resistance is formed. If the Mo content is less than 8.5%, the corrosion resistance is insufficient. On the other hand, when Mo is added excessively relative to Ni content, the amount of carbide increases in proportion of the Mo content, resulting in a large lowering in toughness. Therefore, Mo content is 8.5% to 27.0%. The Mo content is preferably 10.0% to 22.0%, more preferably 13.0% to 20.0%.

[Ta: 0.5% to 2.5%]

Ta has the effect of markedly strengthen the passivation film including Cr and Mo. If Ta is added in an amount equal to or more than 0.5%, an effect of enhancing corrosion resistance against acids is obtained, but, on the other hand, if more than 2.5% of Ta is added, the corrosion resistance enhancing effect is not increased. Therefore, Ta content is 0.5% to 2.5%. The Ta content is preferably 0.8% to 2.0%, more preferably 1.0% to 1.5%.

[W: 15.0% to 51.0% and C: 1.0% to 3.5%]

By adding W and C, a carbide is formed, to thereby enhance abrasion resistance. However, if the addition amounts are increased, the melting point is raised excessively, so that melting becomes difficult to achieve, and hardness becomes excessively high, with the result of a lowering in toughness. Therefore, W content is 15.0% to 51.0%, and C content is 1.0% to 3.5%. Preferably, the W content is 22.5% to 46.0%, and the C content is 1.5% to 3.0%. More preferably, the W content is 28.0% to 41.0%, and the C content is 1.8% to 2.7%.

[Mass Ratio of Ni, Cr, and Mo Ni:Cr:Mo=2.5 to 3.5:1:1.0 to 1.5]

In the present embodiment, the compositional ratios of Ni, Cr, and Mo are important, and if the balance of them is lost, corrosion resistance may be conspicuously lowered, or hardness may be raised excessively with the result of embrittlement. Ni is a main component of the bonding phase, and it is necessary for maintaining toughness. If Ni content is equal to or less than 2.5%, a BCC phase and an intermetallic compound are liable to be formed, with the result of a lowering in toughness. If the Ni content is equal to or more than 3.5%, the amounts of Cr and Mo in the bonding phase are lowered, and corrosion resistance would be lowered. Cr is put into solid solution in a carbide upon solidification, but is not strongly enriched in the carbide. On the other hand, Mo tends to be enriched in a carbide by solidifying segregation, so that Mo amount in the bonding phase may be lowered and corrosion resistance may be lowered. Therefore, Mo should be added in an amount comparable to or more than the amount of Cr. However, if Cr and Mo are added in excessive amounts, a BCC phase and intermetallic compounds are formed, lowering corrosion resistance and toughness. Therefore, it is preferable that Ni:Cr:Mo=2.5 to 3.5:1:1.0 to 1.5. More preferably, Ni:Cr:Mo=2.7 to 3.2:1:1.2 to 1.4.

[Atomic Ratio of W and C W:C=1:0.9 to 1.1]

It is preferable that W and C are contained in the same atomic ratio. If C amount is small as compared to W amount, the carbide is not formed, and, on the other hand, if C amount is large as compared to W amount, free carbon is formed, with a lowering in toughness. Therefore, it is preferable that the atomic ratio of W and C is W:C=1:0.9 to 1.1. More preferably, W:C=1:1.

[Unavoidable Impurities]

In the Ni-based alloy of the present embodiment, as unavoidable impurities in addition to the aforementioned elements, mixing of elements introduced according to the situations of raw material, material, production equipment and the like, for example, P, S, Sn, As, Pb, N, O, B, Nb, Ti, V, and Al is permissible. The content of these unavoidable impurities is preferably as small as possible, preferably equal to or less than 0.1%, and may be 0%.

The composition of the alloy aforementioned can be analyzed by ICP (Inductively Coupled Plasma) emission spectroscopic analysis.

2. Structure of Alloy

The structure of the Ni-based alloy of the present invention typically includes a dendrite structure and a bonding phase surrounding the dendrite structure, through varying depending on the production method and production conditions. FIG. 1 is a schematic view of one mode of the dendrite structure of the Ni-based alloy of the present invention. The dendrite structure is a composite carbide including mainly Cr, Mo, Ta, W, and C, and has a dendrite structure having primary branches (primary arms) 5 extending in the solidification direction, and secondary branches (secondary arms) 6 extending from the primary branches 5. The distance between the adjacent secondary arms in the dendrite structure (the distance of the part denoted by w in FIG. 1) is referred to as a secondary arm interval. As the secondary arm interval is small, hardness is higher, and solidifying segregation becomes less, so that corrosion resistance is also higher. Therefore, the secondary arm interval w of the dendrite is preferably equal to or less than 5 μm. It is sufficient that the secondary arm interval w of equal to or less than 5 μm is present at a part of the dendrite structure, and the secondary arm interval can be measured by use of, for example, a secondary branch method. The details thereof will be described later.

In addition, although the bonding phase contains all the constituent elements of this alloy, the content of Ni is the largest. Since corrosion resistance is worsened if the balance of the Cr amount and Mo amount in the bonding phase is collapsed, it is important to set the component ratios of Ni and Cr and Mo to the aforementioned ratios.

3. Alloy Ingot

The alloy of the present embodiment can have the form of an alloy ingot attended by melting and solidification. The alloy ingot, most typically, can be obtained by a melting and casting method in which after a molten metal is obtained in a melting furnace, the melt is poured into a predetermined mold to solidify the melt. Examples of the melting furnace includes a furnace that performs melting by converting electrical energy into thermal energy, an electric resistance furnace utilizing Joule's heat, a low-frequency induction furnace utilizing an electromagnetic induction current, and a high-frequency induction furnace utilizing an eddy current.

The alloy ingot obtained by the melting and casting method has a shape according to the shape of a mold, and can take various shapes such as flat plate shape and rectangular parallelepiped. In the case of producing the alloy ingot by the melting and casting method, a metallic piece on the millimeter order may also be used. For example, a granular material having a granule diameter of 5 to 50 mm may be used.

In addition, as a production method attended by melting and solidification, there is an additive manufacturing method. The melting and casting method and the additive manufacturing method are common in the point of taking the form of melting and solidification attended by a high cooling rate of $10^4$ to $10^7$ K/s. From this, the "alloy ingot" includes members shaped by the additive manufacturing. The additive manufacturing means to melt and solidify a raw material powder to obtain a member, and has a concept including not only the powder floor melting and bonding system and the directional energy deposition system which will be described later but also powder build-up.

<Ni-Based Alloy Powder>

The Ni-based alloy powder according to the present embodiment (hereinafter also referred to simply as "alloy powder") is a powder having the composition of the aforementioned Ni-based alloy, and the mixing form thereof does not matter. For example, not only the mixed powder in which the raw material powders of the respective metals are mixed in the aforementioned ratios but also granulated powders and atomized powders which will be described below are to be included in the Ni-based alloy powder of the present invention.

[Manufacturing Method for Alloy Powder]

Figure 4:
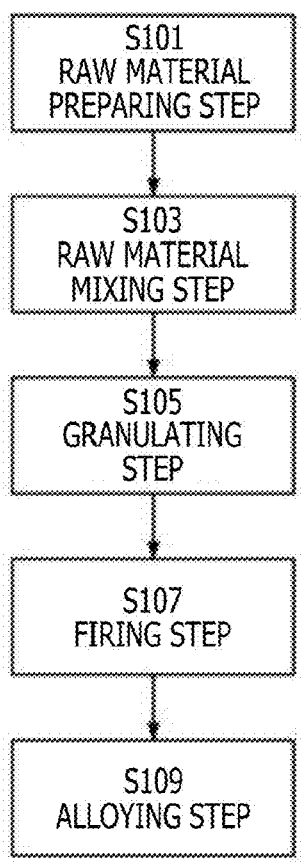
FIG. 4 is a diagram depicting an example of a manufacturing method of a Ni-based alloy powder of the present invention.

An example of a manufacturing method for the alloy powder will be described referring to FIG. 4. FIG. 4 is a diagram depicting an example of the manufacturing method for the Ni-based alloy powder of the present invention. This manufacturing method has a gist of granulating a raw material powder by use of a spray drier, and thereafter firing the granulated powder to obtain an alloy powder.

This manufacturing method includes a raw material preparing step S101, a raw material mixing step S103, a granulating step S105, a firing step S107, and an alloying step S109. In the raw material preparing step S101, as raw material, W and C as ceramic may be added as different powders, or may be added as WC (tungsten carbide) powder. For example, a fine powder of WC and particulates of metals or alloys are prepared according to the composition of the powder material to be manufactured. Here, the particle diameter of the aforementioned particulates of ceramic, for example, $D_{50}$ which is an average particle diameter when the integrated value is 50%, and is preferably equal to or less than 200 μm, more preferably 0.1 to 1.0 μm. In addition, the particulates of metals or alloys include Ni, Cr, Mo and Ta, and the particle diameter of the particulates of metals or alloys in terms of $D_{50}$ is preferably 1.0 to 200 μm. The particle diameters of these raw material powders may be appropriately selected according to the particle diameter of the alloy powder to be obtained.

Next, in the raw material mixing step S103, the raw material powders prepared in the raw material preparing step S101 are mixed with a wax such as paraffin on a wet basis. For the mixing, a known apparatus, for example, Attritor can be used, a dispersant, for example, ethanol is put into the Attritor in addition to the raw material powders and the wax, then wet type mixing is conducted, whereby a slurry of mixed powder can be obtained.

Subsequently, in the granulating step S105, the slurry obtained in the raw material mixing step is sprayed and dried by a spray drier, to thereby granulate the powder of the mixture.

Next, in the firing step S107, the powder of the mixture granulated in the granulating step S105 is put into a drying furnace, and after the powder is degreased at a degreasing temperature of 400° C. to 600° C., the powder is fired at a firing temperature of equal to or more than 600° C. The degreasing temperature is a temperature at which the wax used can be removed, and the firing temperature is a temperature for solidifying the powder particles of the mixture. The granulated powder having undergone firing has the raw material powders fastened to each other, but are not yet alloyed.

Subsequently, in the alloying step S109, the granulated powder having undergone the firing step S107 is exposed to a temperature higher than the firing temperature in the firing step S107 to perform alloying. For the alloying, for example, thermal plasma-droplet-refining (PDR) of passing the granulated powder through a high-temperature zone of a plasma or the like can be used. By the alloying treatment using PDR, the granulated powder is instantaneously melted and solidified. Alternatively, after the firing step S107, the temperature may be further raised for the purpose of alloying, whereby contact parts of the powders can be alloyed. The powder has a strength for use in laminate shaping.

Here, the thermal plasma is an ionized gas obtained by applying energy to a gas to dissociate the molecules in the gas into the state of atoms and further ionizing the atoms into ions and electrons. As compared to the conventional manufacturing method in which a metallic piece is heated by an electric furnace, the thermal plasma can heat to a very high temperature, specifically, heating in a high temperature zone to a temperature of equal to or more than 5,000° C. can be performed. In the thermal plasma forming such an extremely high temperature atmosphere, the powder of a high melting point such as Mo powder can be instantaneously melted.

In addition, by the thermal plasma, an extremely high temperature atmosphere can be locally generated, and, therefore, a steep temperature gradient can be formed between the region of the thermal plasma and the surrounding atmosphere. By the steep temperature gradient, the metallic piece is instantaneously melted in the high temperature zone of the thermal plasma, and is spheroidized by its own surface tension. The spheroidized metallic pieces is rapidly cooled to or below melting point by the surrounding atmosphere, to be solidified, whereby metallic spheres can be formed.

By the above steps, the alloy powder according to the present embodiment is manufactured. In this way, the granulated powder having undergone the firing step S107 whereby the wax has been removed and the powder has been solidified is instantaneously heated in the alloying step S109 to be melted and solidified. As a result, the dendritic structure of the alloy powder obtained is fine. In addition, the alloy composition obtained has respective particles in a shape close to true sphere by the surface tension, that is, in an observed image of the particle as a whole, a shape in which gaps are not observed in the surface is obtained, and the particle surface is smooth.

[Other Powder Manufacturing Methods]

In addition, as one mode of the alloy powder of the present invention, the alloy powder can be manufactured also by an atomizing method. The atomizing method is a method of scattering a molten metal into liquid droplets by kinetic energy of a high-pressure spray medium and solidifying to manufacture a powder. The atomizing method is classified into a water atomizing methods, a gas atomizing method, and a jet atomizing method according to the spray medium applied. For manufacturing the alloy powder according to the present embodiment, any of the atomizing methods may be adopted. The alloy powder obtained by the atomizing method is also melted and solidified, and the solidification rate is high, so that its dendritic structure can be fine.

The water atomizing method is a method in which a molten metal is caused to flow down from a bottom portion of a tundish, high-pressure as a spray medium is blown to the molten metal flow, to spray by the kinetic energy of the water. The water atomizing method is higher than the other atomizing methods in cooling rate at the time of solidification. It is to be noted, however, that the powder obtained by the water atomizing method is irregular in shape.

The gas atomizing method is based on the use of a high-pressure gas as a spray medium, for example, an inert gas such as nitrogen and argon or air. The powder obtained by the gas atomizing method is liable to be spheroidized. This is interpreted mainly because the cooling rate by gas is slow as compared to the cooling rate by water, and the molten particles as liquid droplets are spheroidized by the surface tension.

The jet atomizing method is a method in which a burning flame of kerosene or the like is used as the spray medium, a flame jet at a high speed in excess of sound speed and at a high temperature is jetted to the molten metal, whereby the molten metal is accelerated and pulverized for a comparatively long time. This powder is liable to be spheroidized, and a more refined particle size distribution can be obtained. In the additive manufacturing, when a powder higher in sphericity and better in fluidity is used, the additive manufacturing product is higher in quality and has fewer defects such as porosity. Among the aforementioned, a powder obtained by the gas atomizing method by which a powder with high sphericity can be obtained is preferred.

An EiGA method (electrode induction melting gas atomizing method) is a method in which an ingot is preliminarily produced, and the ingot is used as an electrode material to be melted by an induction coil, thereby directly atomizing. MoCr and NiAl have different melting points, so that they may be separated in the atomizing furnace depending on the composition, but in this case, by producing the ingot in a furnace with a high stirring force and applying the EIGA method, a powder with homogeneous composition can be obtained.

The manufacturing methods for the alloy powder described above are merely examples, and the alloy powder of the present invention can be manufactured also by other manufacturing methods.

[Additive Manufacturing Method]

The additive manufacturing method with a metallic material as an object can be classified into PBF (Powder Bed Fusion) system and DED (Directed Energy Deposition) system. The additive manufacturing project of the present embodiment can be shaped by either system.

The powder bed fusion system is referred to as a powder bed system, and is a method in which an alloy powder is spread all over, and the part to be shaped is melted and solidified by a laser beam or an electron beam as a heat source. The metallic powder is spread all over, and melting and solidification are repeated, thereby shaping. The powder bed system includes a laser beam heat source system and an electron beam heat source system which will be described below.

The laser beam heat source system is a system in which a laser beam is applied to a metallic powder material spread all over and melting and solidification or melting and sintering are conducted to perform additive shaping, and there is known a Selective Laser Melting (SLM) method and a Selective Laser Sintering (SLS) method. In the laser beam heat source system, melting and solidification or melting and sintering are performed in an atmosphere of an inert gas such as nitrogen.

The electron beam heat source system is a system in which an electron beam is applied in a high vacuum to a metallic powder spread all over, to collide the metallic powder, whereby kinetic energy is converted into heat, to melt the powder. In the electron beam system, melting and solidification are conducted in vacuum. The electron beam heat source system is referred to as Selective Electron Beam Melting (SEBM) methods.

In addition, the directed energy deposition system is referred to as a Laser Metal Deposition (LMD) system, in which a metallic powder is continuously jetted to a front position in the direction of movement of a laser beam or an electron beam, and the laser beam or the electron beam is applied to the metallic powder supplied, to perform melting and solidification, thereby shaping. It is also referred to as powder build-up welding, whereby a build-up layer can be formed on the surface of a base material. For powder build-up, for example, plasma powder build-up welding and laser powder build-up welding can be used. The plasma powder build-up welding uses a plasma as a heat source. Since the plasma powder build-up welding is conducted in an inert argon atmosphere, a build-up layer of which the surface is smooth and few pores are present in the inside can be formed. The laser powder build-up welding uses a laser as a heat source. Since the laser powder build-up welding can narrow a heat input region, it has the merit that build-up can be performed on a thin object. In addition, in the laser powder build-up welding, the region where temperature is raised is small, so that temperature gradient relative to the base material is large, and, after the passage of the laser light, temperature is rapidly lowered, resulting in rapid cooling. Therefore, since melting and solidification are caused, it is advantageous for making fine the dendritic structure.

While the powder bed system has a merit that the shape accuracy of the additive shaped body (laminated shaped body) is high, the metal deposition system has a merit that high-speed shaping is possible. Among the powder bed systems, the SLM (Selective Laser Melting) is a method in which a powder bed with a laminated layer thickness on the order of several tens of micrometers is subjected to selective melting and solidification by use of a fine laser beam, and solidified layers are laminated to achieve additive shaping, and is characterized in that precision parts can be shaped, as compared to the other additive shaping methods.

[Particle Diameter of Alloy Powder]

The additive shaping method is a shaping method in which each powder is repeatedly subjected to melting and solidification to gradually achieve shaping. For example, in the powder bed method by SLM, if an average particle diameter of the Ni-based alloy powder is less than 5 µm, a volume necessary for one time of melting and solidification cannot be easily obtained, so that a sound alloy member cannot be easily obtained. When the powder with the average particle diameter of less than 5 µm is little, the yield of the powder is enhanced, and it contributes to reduction of defect rate. On the other hand, when the average particle diameter of the Ni-based alloy powder exceeds 150 µm, the volume necessary for one time of melting and solidification is excessively large, and a sound laminated shaped product cannot be easily obtained. When the powder with an average particle diameter in excess of 150 µm is little, power deficiency of laser is restrained, and it contributes to reduction of defect rate. In other words, in the powder bed method by SLM, it is preferable to use a Ni-based alloy powder having an average particle diameter $D_{50}$ in the range of 5 to 150 µm. More preferably, the average particle diameter $D_{50}$ is 20 to 80 µm. On the other hand, in the LMD, since the beam diameter is larger than in the SLM, it is possible to enlarge the particle diameter of the alloy powder to be used. From such a point, a powder with a particle diameter in the range of 5 to 500 µm can be used, preferably 60 to 200 µm, more preferably 80 to 120 µm. The average particle diameter $D_{50}$ is 20 to 150 µm.

Note that the particle diameter of the powder aforementioned is a value obtained by measuring particle size distribution by use of a laser diffraction type particle size measuring apparatus.

<Alloy Member>

The alloy member is an additive manufacturing product (AM product) manufactured by AM (Additive Manufacturing) using the aforementioned Ni-based alloy powder. Specific examples of the alloy member using the Ni-based alloy powder of the present invention includes a screw of an injection molding machine, various pipings for transport of a corrosive gas and a corrosive product, and a bit of an excavator.

The present invention will be further specifically described by way of Examples and Comparative Examples.

Examples

[Production of Alloy Ingot]

The following five kinds of raw materials were prepared, and the raw materials weighed such as to provide the alloy compositions (unit: mass %) of Table 1 were put into an aluminum crucible and mixed together.

The respective raw materials were as follows.

Ni: spherical particles with a particle diameter of 8 to 15 mm, Cr: powder with a particle diameter of 63 to 90 µm, Mo: fine powder with an average particle diameter of 1.5 µm, Ta: powder with a particle diameter of equal to or less than 45 µm, WC: powder with an average particle diameter of 100 µm

TABLE 1

|  | mass % | | | | | | Mass Ratio | Atomic Ratio |
| --- | --- | --- | --- | --- | --- | --- | --- | --- |
|  | Ni | Cr | Mo | Ta | W | C | Ni:Cr:Mo | W:C |
| Comparative Example 1 | 23.5 | 10.8 | 21.4 | 1.0 | 40.6 | 2.7 | 2.2:1:2.0 | 1:1 |
| Comparative Example 2 | 21.7 | 6.8 | 6.8 | 0.7 | 60.1 | 3.9 | 3.2:1:1 | 1:1 |
| Example 1 | 41.7 | 13.1 | 13.1 | 1.3 | 28.9 | 1.9 | 3.2:1:1 | 1:1 |
| Example 2 | 35 | 13.1 | 19.8 | 1.3 | 28.9 | 1.9 | 2.7:1:1.5 | 1:1 |
| Example 3 | 34.1 | 10.8 | 10.8 | 1.0 | 40.6 | 2.7 | 3.2:1:1 | 1:1 |
| Example 4 | 27.5 | 8.7 | 8.7 | 0.8 | 51.0 | 3.3 | 3.2:1:1 | 1:1 |

Next, the above raw materials were melted in a high-frequency induction melting furnace, and was poured into a water-cooled copper-made die to produce an alloy ingot. After the thus obtained ingot was processed into a predetermined shape, the shaped specimens were served to each test. The alloy ingot is an alloy member obtained by the embodiment attended by melting and solidification as aforementioned.

(Hardness Measurement)

After a section of the specimen was cut, the section was polished to a mirror surface by use of an emery paper and diamond abrasive grains, Vickers hardness was measured by a Vickers hardness tester at room temperature under a load of 500 gf for a holding time of 15 seconds, and the obtained values were converted into Rockwell hardness HRC by a hardness conversion table (SAE J 417). The measurement was conducted five times, and the average values of the five-time measurements were recorded. The case where the hardness HRC was 55 to 65 was rated as "acceptable" and the cases where the hardness HRC was less than 55 or in excess of 65 were rated as "rejectable" because of embrittlement. The measured values and evaluation results are set forth in Table 2 below.

(Corrosion Resistance Evaluation)

The aforementioned specimen was cut to 10 mm×10 mm×2.5 mm, the whole surfaces were polished to a waterproof emery paper #1000, after which the specimen was degreased with acetone and ethanol, and was served to test. First, before immersion, size and weight were measured. The test included immersing the specimen in 10% $H_2SO_4$ kept at 40° C. for 10 hours, and taking out the specimen, followed by measurement of weight change and SEM observation.

In addition, the corrosion rate was calculated by the following formula (1).

$$s = (g_0 - g_a)/(A \times t) \quad \text{Formula (1)}$$

where s is corrosion rate [$g/m^2/h$], $g_0$ is sample weight [g] before immersion in boiling sulfuric acid, $g_a$ is sample weight [g] after immersion in boiling sulfuric acid, A is surface area [$m^2$] of the sample, and t is immersion test time [h].

Each sample was subjected to test three times, and the highest corrosion rate was made to be the typical value of the sample. The case where the corrosion rate was equal to or less than 1.0 [$g/m^2/h$] was rated "acceptable," the case where the corrosion rate was in excess of 1.0 [$g/m^2/h$] was rated "rejectable," and unevaluated case was "-."

TABLE 2

|  |  | Hardness | | Corrosion Resistance | |
| --- | --- | --- | --- | --- | --- |
|  | Dossivability | Measurements [HRC] | Quality | Measurements [$g/m^2/h$] | Quality |
| Comparative Example 1 | acceptable | 75.4 | rejectable | 0.016 | acceptable |
| Comparative Example 2 | rejectable | — | — | — | — |
| Example 1 | acceptable | 59.7 | acceptable | 0.010 | acceptable |
| Example 2 | acceptable | 62.3 | acceptable | 0.010 | acceptable |
| Example 3 | acceptable | 57.5 | acceptable | 0.012 | acceptable |
| Example 4 | acceptable | 58.7 | acceptable | 0.579 | acceptable |

As shown in Table 2, Comparative Example 2 was large in addition amounts of W and C and the melting point was high, so that melting itself was difficult. Other compositions than Comparative Example 2 were meltable, and all were excellent in corrosion resistance. On the other hand, Comparative Example 1 in which the component balance of Ni and Cr and Mo was collapsed was too high in hardness, and was embrittled.

(Structure Observation)

Figure 2:
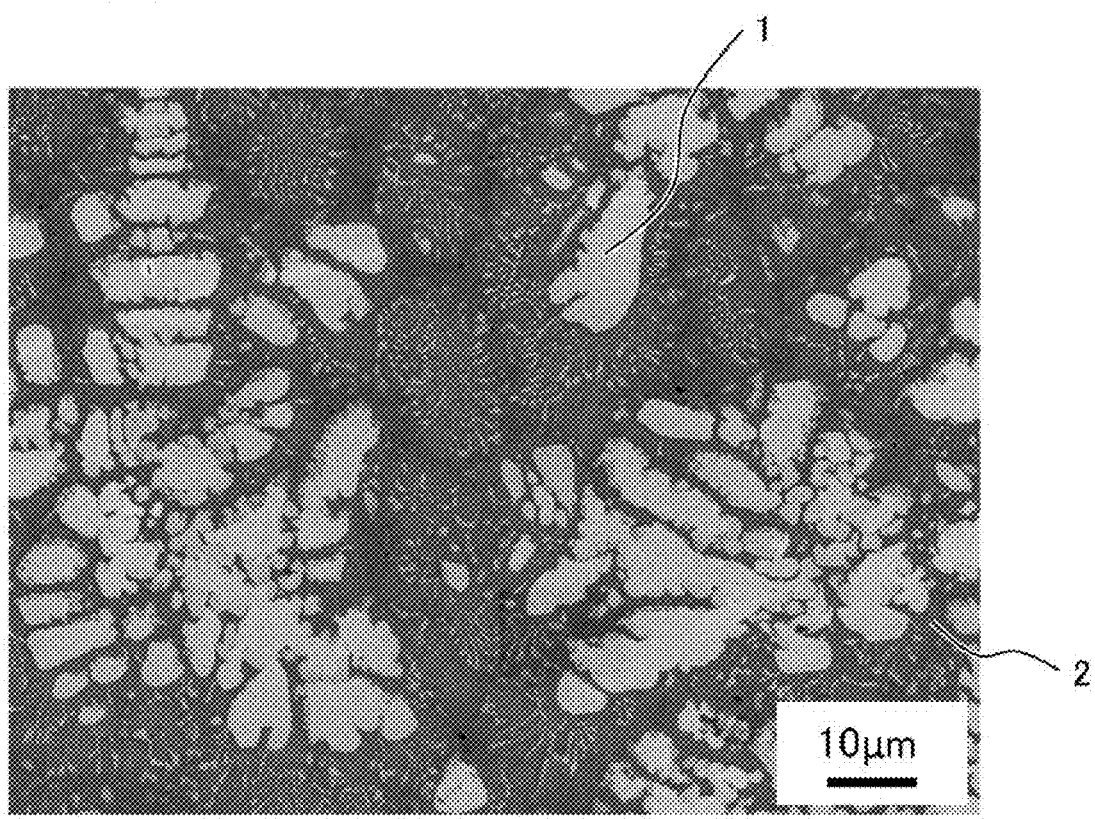
FIG. 2 is a backscattered electron image (magnification: 1,000 times) of an Ni-based alloy of Example 3.

FIG. 2 is a backscattered electron image (magnification: 1,000 times) of the Ni-based alloy of Example 3. Note that the backscattered electron image was imaged by use of a scanning electron microscope (S-3400N, made by HITACHI Ltd.). The amount of the backscattered electrons generated is larger as the atomic weight of the element constituting the sample is greater. In other words, as the sample contains a greater number of elements having a large atomic weight, the sample is observed in white. From the backscattered electron image, a dendrite structure 1 (the parts appearing white) characteristic of solidification structure and a bonding phase 2 (the parts appearing black) are observed, and the dendrite structure 1 was observed in white. In other words, it is seen that the dendrite structure 1 is composed of elements with heavy atomic weight.

The dendrite structure 1 and the bonding phase 2 of the Ni-based alloy of Example 3 were subjected to composition analysis by EDX. The results (unit: mass %) are set forth in Table 3 below. Note that due to contaminants deposited on the sample surface, the amount of C is detected to be higher as a whole. From the analytical results set forth in Table 3, much C is detected in the dendrite structure 1, and, since Mo and W which are carbide forming elements are enriched, the structure is considered to be primary crystal carbide. In addition, the total of mass % of W and Mo in the dendrite structure 1 was 73.6%. Conversely, since Mo is enriched in the dendrite structure 1, the amount of Mo in the bonding phase 2 is reduced.

TABLE 3

|  | mass % | | | | |
| --- | --- | --- | --- | --- | --- |
|  | Ni | Cr | Mo | W | C |
| Dendrite structure 1 | 1.0 | 8.8 | 15.4 | 58.2 | 16.6 |
| Bonding phase 2 | 55.3 | 10.4 | 4.2 | 16.2 | 13.9 |

[Production of Additive Manufacturing Product]

Next, using the powder of the composition of Example 3, additive manufacturing was conducted by laser deposition (LMD method) of the directed energy deposition system. As the additive manufacturing apparatus, Lasertec 65-3D, made by DMG Mori Co., Ltd. was used. Note that as the powder, a granulated powder having an average particle diameter of 103.5 μm ($D_{50}$) was used. The shaping was eight passes per layer, and the material was deposited such as to have a height of 10 mm, and was laminated on the order of 20 layers. The additive shaping conditions were a fiber laser output of 1,200 W, a scanning speed of 100 mm/min, and a powder supply amount of 2.0 g/min. As a result, melting and solidification were performed normally, and an additive manufacturing product was manufactured.

A specimen was cut out from the additive manufacturing product, and hardness and corrosion resistance were evaluated similarly to the aforementioned. As a result, the hardness was 58.0 HRC, and the corrosion rate was 0.009 [g/m$^2$/h], with the hardness and corrosion resistance being enhanced.

(Structure Observation of Additive Manufacturing Product)

Figure 3:
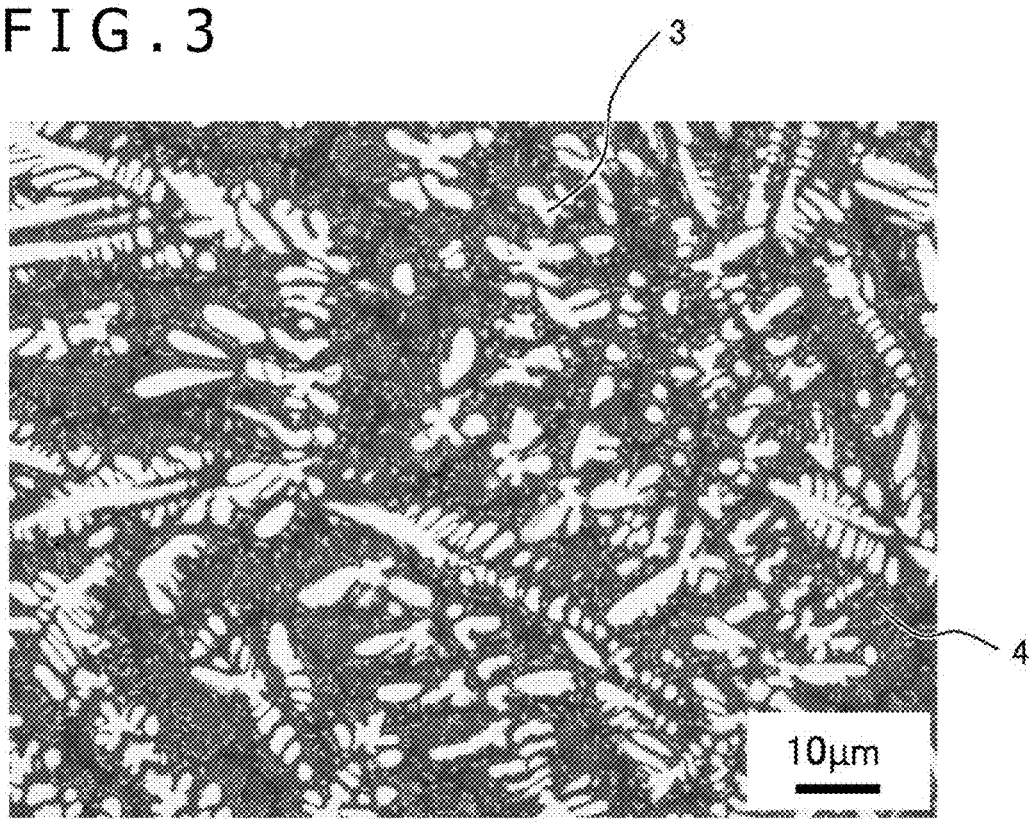
FIG. 3 is a backscattered electron image (magnification: 1,000 times) of the additive manufacturing product manufactured by use of the powder of Example 3.

FIG. 3 is a backscattered electron image (magnification: 1,000 times) of the additive manufacturing product manufactured by use of the powder of Example 3. A dendrite structure 3 (primary crystal carbide) was confirmed, like FIG. 2. On the other hand, it is seen that the dendrite structure 3 is more refined, as compared to that obtained by a high-frequency melting method. Table 4 set forth the results (unit: mass %) of EDX composition analysis of the additive manufacturing product. It is seen that the amount of Mo in the bonding phase 4 of the additive manufacturing product is large as compared to the bonding phase 2 of the high-frequency melted material set forth in Table 3. This is considered that because the cooling rate from the molten state until solidification is high in the additive manufacturing method as compared to the high-frequency melting method, solidifying segregation was not liable to be generated. The cooling rate has interrelation with the dendrite secondary arm interval in the structure, meaning that the cooling rate is higher as the secondary arm interval is narrower. In addition, the total of mass % of W and Mo in the dendrite structure 3 was 75.6%.

The dendrite secondary arm intervals of the dendrite structure 1 of an alloy (alloy ingot) melted and cast and the dendrite structure 3 of the additive manufacturing product were measured by the secondary branch method, to be 5.45 and 1.35 μm, respectively, in terms of average value for five times of measurement. In other words, it is considered that the additive manufacturing is higher in cooling rate than the melting and casing method, so that solidifying segregation is not liable to occur. Since solidifying segregation is not liable to occur, it is considered that enrichment of Mo into carbide which contributes to corrosion resistance is restrained, so that corrosion resistance was improved.

TABLE 4

| | mass % | | | | |
| --- | --- | --- | --- | --- | --- |
| | Ni | Cr | Mo | W | C |
| Dendrite structure 3 | 2.4 | 7.6 | 15.6 | 59.8 | 14.6 |
| Bonding phase 4 | 57.6 | 11.1 | 4.7 | 14.6 | 12.0 |

Figure 6A:
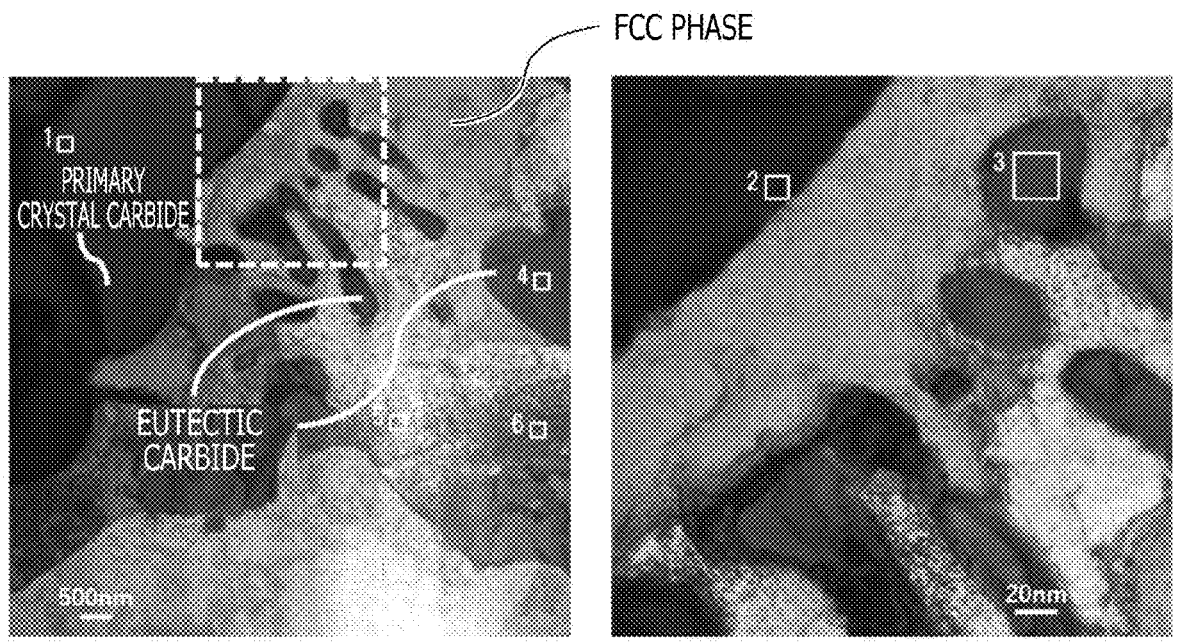
FIG. 6 is TEM images (magnification: 3,000 times, 100,000 times) of an additive manufacturing product produced using the powder of Example 3.
Figure 6B:
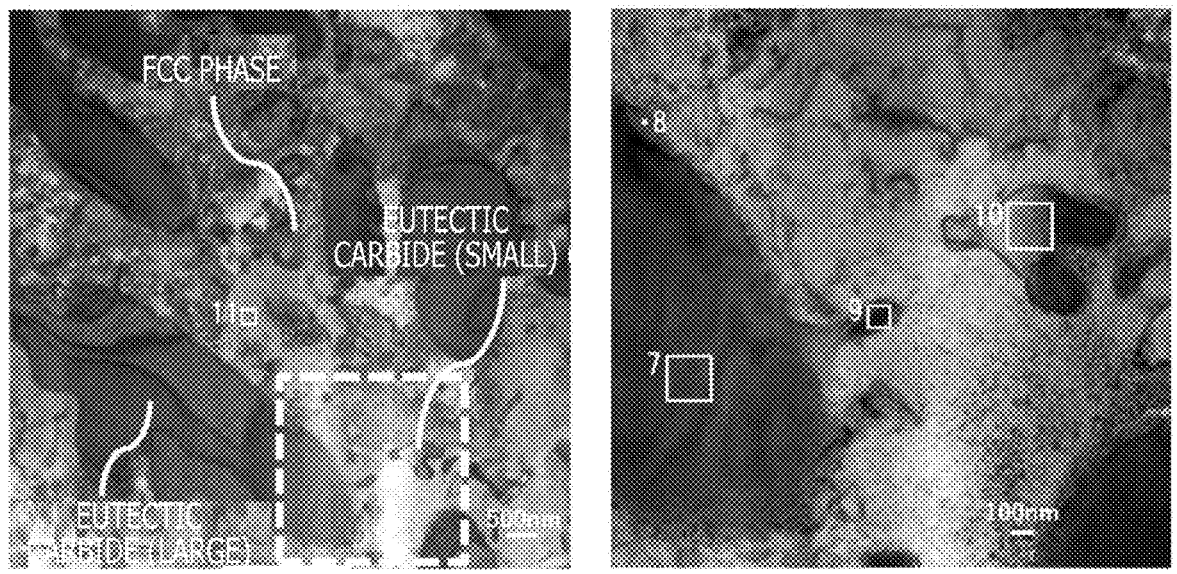

Next, the aforementioned alloy (alloy ingot) obtained by melting and casting the powder of Example 3 and the aforementioned additive shaped body produced using the powder of Example 3 were put to high-magnification observation (magnification: 3,000 times, 100,000 times) by TEM (Transmission Electron Microscope) (model HF-2100, made by Hitachi High-Tech Corporation, acceleration voltage: 200 kV) for composition analysis and structure evaluation of the carbide. FIG. 5 depicts TEM images of the alloy obtained by melting and casting the powder of Example 3. FIG. 5(a) depicts a TEM image (magnification: 3,000 times) of the aforementioned alloy (alloy ingot), and FIG. 5(b) depicts a TEM image (magnification: 100,000 times) obtained by enlarging the part surrounded by white dot line frame in the TEM image of FIG. 5(a). In addition, FIG. 6 depicts TEM images of the additive manufacturing product manufactured by use of the powder of Example 3. FIG. 6(a) depicts a TEM image (magnification: 3,000 times) of the aforementioned additive manufacturing product, and FIG. 6(b) depicts a TEM image (magnification: 100,000 times) obtained by enlarging the part surrounded by white dot line frame in the TEM image of FIG. 6(a).

As depicted in FIGS. 5 and 6, as a result of high-magnification observation, a fine eutectic structure was confirmed in the bonding phase. In addition, each structure in the TEM images was subjected to elemental analysis of the dendrite structure 1 (primary crystal carbide) and the eutectic structure, by use of EDS (Energy Dispersive X-ray Spectroscopy) analysis. The respective analytical results are set forth in Tables 5 and 6. As a result of the EDS analysis, the eutectic structure has a structure similar to the dendrite structure 1 (primary crystal carbide), so that it is considered to be a carbide (eutectic carbide). In addition, it has been found that the dendrite structure 1 (primary crystal carbide) differs in Cr concentration between the inside and a peripheral part, and the Cr concentration is higher in the peripheral part than the inside (central part). The ratio of Cr to W of the carbide having a high Cr concentration was equal to or more than 0.1. In addition, it has been confirmed that the Cr enriched part of the eutectic carbide also had a ratio of Cr to W of equal to or more than 0.1.

Figure 7A:
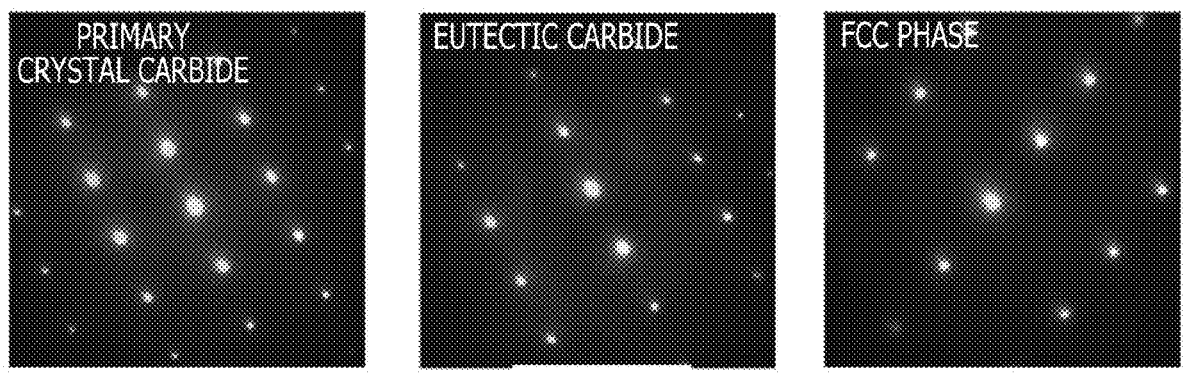
FIG. 7 is an electron diffraction pattern of an alloy melted and cast using the powder of Example 3.
Figure 7B:
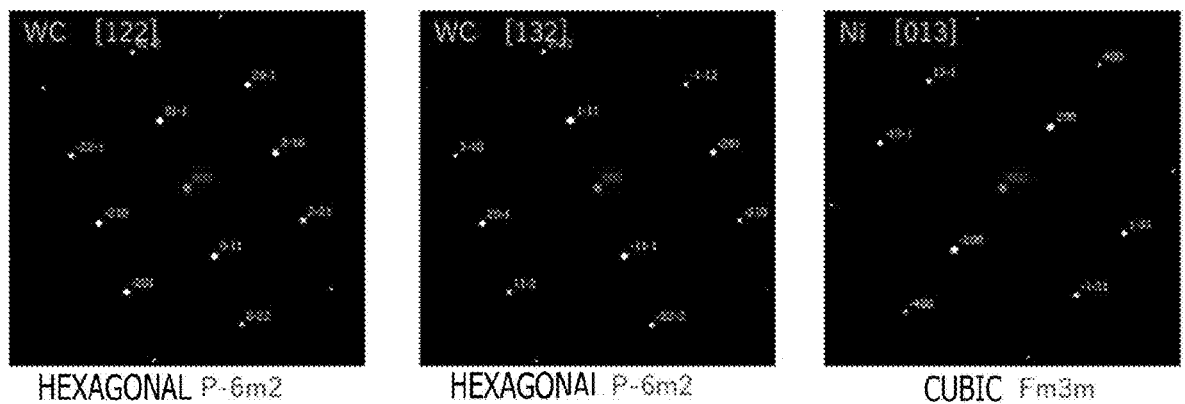

With respect to the aforementioned carbide, crystal structure was analyzed from an electron diffraction pattern. With respect to the dendrite structure 1 (primary crystal carbide) and the eutectic carbide confirmed in the bonding phase of the aforementioned alloy (alloy ingot) obtained by melting and casting of the powder of Example 3, FIG. 7(a) depicts an electron diffraction pattern observed, and FIG. 7(b) depicts an electron diffraction pattern with the case in which the crystal structure is simulated to be hexagonal P6m2 (WC). As a result of comparison between FIG. 7(a) and FIG. 7(b), it is considered that the dendrite structure 1 (primary crystal carbide) and the eutectic carbide confirmed in the bonding phase of the aforementioned alloy (alloy ingot) obtained by melting and casting of the powder of Example 3 are hexagonal P6m2 (WC).

Figure 8A:
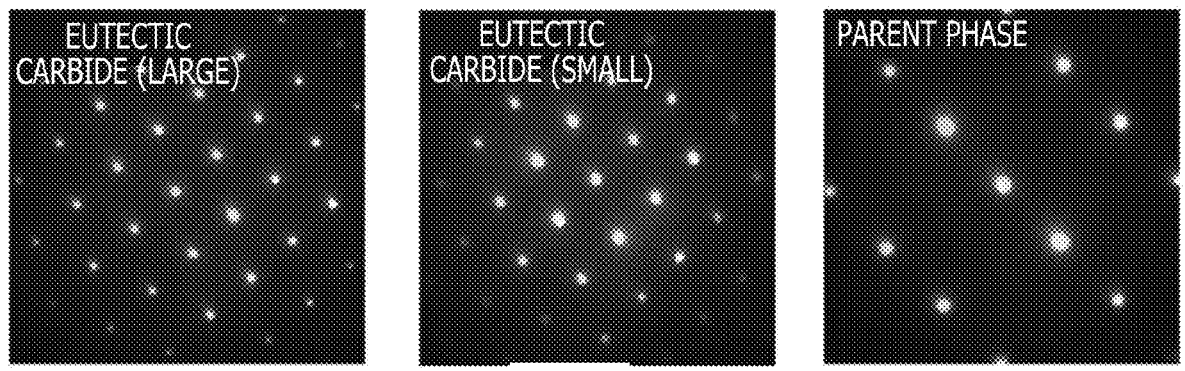
FIG. 8 is an electron diffraction pattern of an additive manufacturing product produced using the powder of Example 3.
Figure 8B:
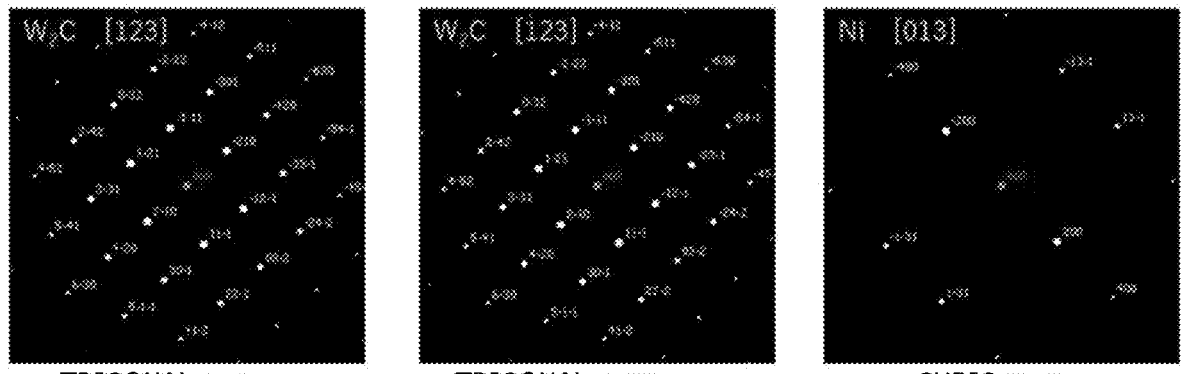
Figure 9:
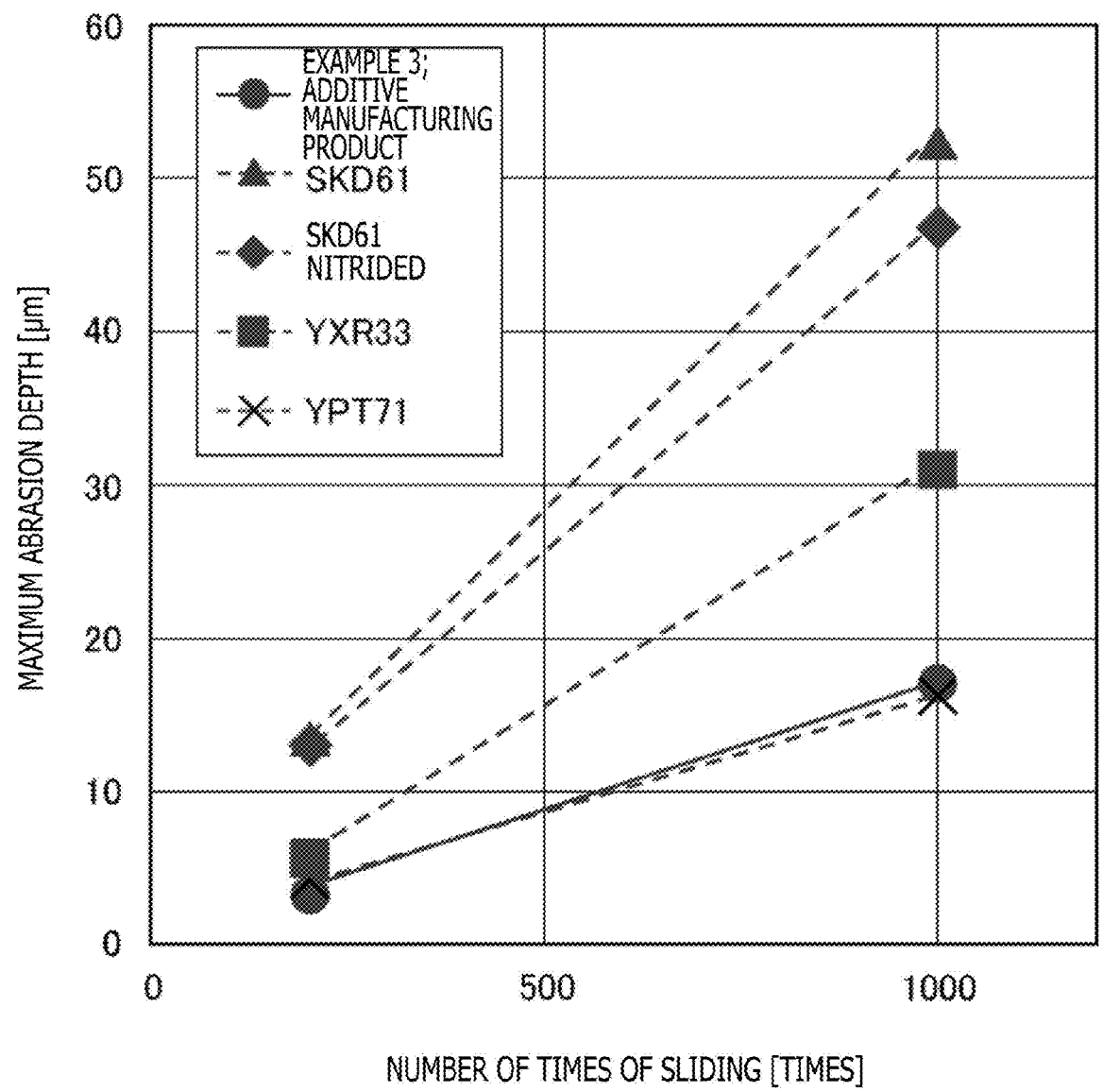
FIG. 9 is a graph depicting the results of high temperature abrasion test of an additive manufacturing product produced using the powder of Example 3.

Next, with respect to the eutectic carbide (large) and the eutectic carbide (small) confirmed in the bonding phase of the aforementioned additive shaped body produced by use of the powder of Example 3, FIG. 8(a) depicts an electron diffraction pattern observed, and FIG. 8(b) depicts an electron diffraction pattern in the case where the crystal structure is simulated to be trigonal P31m (W2C). As a result of comparison between FIG. 8(a) and FIG. 8(b), it is considered that the crystal structures of the eutectic carbide (large) and the eutectic carbide (small) confirmed in the bonding phase of the aforementioned additive shaped body produced by use of the powder of Example 3 are similar to trigonal P31m (W2C).

In this way, the carbide in the alloy of the present example is characterized in that the concentration ratio of Cr and W is equal to or more than 0.1. With Cr put in solid solution in the carbide, enhancement of corrosion resistance of the carbide itself can be expected.

TABLE 5

| | Analysis position | | Ni | Cr | Mo | Ta | W | Cr/W ratio |
|---|---|---|---|---|---|---|---|---|
| 1 | Primary | Inside | 1.1 | 5.1 | 13.4 | 2.8 | 77.6 | 0.07 |
| 2 | crystal carbide | Peripheral part | 4 | 8.6 | 15 | 2.3 | 70.1 | 0.12 |
| 3 | Eutectic | A | 1.8 | 10.9 | 15.7 | 2.9 | 68.7 | 0.16 |
| 4 | carbide | B | 1.7 | 16.5 | 18.7 | 3.7 | 59.4 | 0.28 |
| 5 | FCC phase | A | 61.2 | 11.1 | 4.7 | 4.6 | 18.4 | 0.6 |
| 6 | (parent phase) | B | 65.2 | 13.4 | 4 | 3.8 | 13.6 | 0.99 |

TABLE 6

| | Analysis position | | Ni | Cr | Mo | Ta | W | Cr/W ratio |
|---|---|---|---|---|---|---|---|---|
| 7 | Eutectic | Inside | 1.6 | 7 | 13.2 | 3.3 | 74.9 | 0.09 |
| 8 | carbide (large) | Cr enriched part A | 2.2 | 15.1 | 17.2 | 3.4 | 62.1 | 0.24 |
| 9 | | Cr enriched part B | 6.2 | 16.7 | 17 | 3.1 | 56.9 | 0.29 |
| 10 | Eutectic carbide (small) | | 2.6 | 20.9 | 19.3 | 3.5 | 53.7 | 0.39 |
| 11 | FCC phase (parent phase) | | 65.1 | 12.8 | 5 | 3.5 | 13.6 | 0.94 |

[Abrasion Resistance Test of Additive Manufacturing Product]

Next, with respect to a specimen obtained from the additive manufacturing product produced from the powder of Example 3, a high-temperature abrasion test was conducted. FIG. 7 is a graph depicting the results of the high-temperature abrasion test. Note that for comparison, hot mold steel (JIS (Japanese Industrial Standards)) SKD61, a steel obtained by subjecting SKD61 to nitriding treatment (hereinafter referred to also "SKD61 nitrided"), YXR33 and injection molding screw steel (YPT71) were subjected to the same test. Note that "YXR" and "YPT" are registered trademarks of Hitachi Metals, Ltd. In addition, the nitriding treatment was conducted using plasma nitriding, and a specimen in which nitrogen was diffused from the most surface to a depth of 100 μm was served to the test.

The test conditions are as follows, including pressing a specimen to the periphery of a cylindrical work rotated eccentrically. The number of times of vibration on the axis of abscissas in FIG. 7 corresponds to the rotational speed of the work.

Test Conditions:
Work temperature: 900° C.,
Specimen temperature: on the order of 25 to 100° C.,
Speed of work periphery: 30 m/min,
Perpendicular load: 250 N As depicted in FIG. 7, it has been verified that the additive manufacturing product of Example 3 has a very high abrasion resistance as compared to the hot mold steels (SKD61, SKD61 nitrided, and YXR33), and has an abrasion resistance comparable to that of the injection molding screw steel (YPT71).

[Trial Production of Ni-Based Alloy Member]

By use of the powder of the composition of Example 3, injection molding screws were produced by the two methods of the melting and casting method and the laser deposition method of the directed energy deposition system (DED system). Note that the screw produced had a diameter of a valley portion of 20 mm, a length of 400 mm, a fin thickness of 3 mm, and a fin-fin distance of 25 mm. In addition, in the laser deposition, a stainless steel round rod with a diameter of a valley portion of 16 mm was prepared as a base material, and additive manufacturing by laser powder build-up welding was conducted on the surface such that the powder of Example 3 was built up in an additive shaping thickness of 2 mm. The additive shaping was conducted under a laser output of 1,200 W, a scanning speed of 100 mm/min, and the powder supply amount of 2.0 g/min. Thereafter, fins are additive shaped by laser deposition such as to attain the aforementioned shape, and an alloy member was produced. Finally, the surface was finished by cutting.

The two screws produced in this way and a screw produced from a high-Cr high-C tool steel were each mounted to an injection molding apparatus, and injection molding was conducted for six months. Thereafter, the screws were detached, and visual observation of abrasion amount and corrosion state was conducted. As a result, while pits due to corrosion were confirmed in the tool steel-made screw, pits due to corrosion were not confirmed in the two screws produced by the alloy material of the present invention. In addition, as a result of measurement of abrasion amount, as compared to the tool steel-made screw, the screw produced by the melting and casting method using the alloy material of the present invention showed an abrasion amount of 1/5 times, and the screw produced by the additive shaping method showed an abrasion amount of 1/10 times.

As above-described, according to the present invention, it is possible to provide a Ni-based alloy capable of being melted and solidified by the additive manufacturing method and being excellent in corrosion resistance and abrasion resistance, a Ni-based alloy powder thereof, and a Ni-based alloy member thereof.

Note that the present invention is not limited to the Examples of the present invention, and includes various modifications. For example, the above Examples are described in detail for easily understandably explain the present invention, and the examples of the present invention are not limited to those which include all the described configurations. In addition, part of the configuration of a certain example may be replaced by the configuration of other example, and the configuration of other example can be added to the configuration of a certain example. Besides, with respect to part of the configuration of each example, addition, deletion, and replacement of other configuration are possible.

DESCRIPTION OF REFERENCE CHARACTERS 1, 3: Dendrite structure
2, 4: Bonding phase
5: Primary arm
6: Secondary arm

The invention claimed is:

1. A Ni-based alloy comprising, by mass %:
   Cr: 8.5% to 23.0%;
   Mo: 8.5% to 27.0%;
   Ta: 0.5% to 2.5%;
   W: 15.0% to 51.0%; and
   C: 1.0% to 3.5%, a balance being Ni and unavoidable impurities, wherein
   mass ratios Ni:Cr:Mo of Ni, Cr, and Mo are 2.5 to 3.5:1:1.0 to 1.5.

2. The Ni-based alloy according to claim 1, wherein an atomic ratio W:C of W and C in the Ni-based alloy is 1:0.9 to 1.1.

3. The Ni-based alloy according to claim 1, including a dendrite structure and a bonding phase surrounding the dendrite structure.

4. The Ni-based alloy according to claim 3, wherein the dendrite structure has a primary arm, and a secondary arm projecting from the primary arm, and an interval between adjacent secondary arms is equal to or less than 5.0 μm.

5. The Ni-based alloy according to claim 3, wherein a region where Cr/W ratio is different is present in the dendrite structure.

6. The Ni-based alloy according to claim 5, wherein a eutectic carbide with a high Cr/W ratio in the dendrite structure is present in a peripheral portion as compared to a central portion of the dendritic structure.

7. A Ni-based alloy powder comprising, by mass %:
Cr: 8.5% to 23.0%;
Mo: 8.5% to 27.0%;
Ta: 0.5% to 2.5%;
W: 15.0% to 51.0%; and
C: 1.0% to 3.5%, a balance being Ni and unavoidable impurities, wherein
mass ratios Ni:Cr:Mo of Ni, Cr, and Mo are 2.5 to 3.5:1:1.0 to 1.5.

8. The Ni-based alloy powder according to claim 7, wherein an atomic ratio W:C of W and C in the Ni-based alloy powder is 1:0.9 to 1.1.

9. The Ni-based alloy powder according to claim 7, wherein average particle diameter is 5 to 150 μm.

10. The Ni-based alloy powder according to claim 7, which is a mixed powder, a granulated powder, or an atomized powder.

11. A Ni-based alloy member comprising, by mass %:
Cr: 8.5% to 23.0%;
Mo: 8.5% to 27.0%;
Ta: 0.5% to 2.5%;
W: 15.0% to 51.0%; and
C: 1.0% to 3.5%, a balance being Ni and unavoidable impurities,
wherein mass ratios Ni:Cr:Mo of Ni, Cr, and Mo are 2.5 to 3.5:1:1.0 to 1.5.

12. The Ni-based alloy member according to claim 11, wherein an atomic ratio W:C of W and C is 1:0.9 to 1.1.

13. The Ni-based alloy member according to claim 11, which has a dendrite structure.

14. The Ni-based alloy member according to claim 13, wherein the dendrite structure has a primary arm, and a secondary arm projecting from the primary arm, and an interval between adjacent secondary arms is equal to or less than 5.0 μm.

15. The Ni-based alloy member according to claim 13, wherein a region where a Cr/W ratio is different is present in the dendrite structure.

16. The Ni-based alloy member according to claim 15, wherein a eutectic carbide with a high Cr/W ratio in the dendrite structure is present in a peripheral portion as compared to a central portion of the dendritic structure.

17. A product including an Ni-based alloy member which is the Ni-based alloy member according to claim 11.

18. A product including an N-based alloy member according to claim 17, wherein the product is any one of an injection molding screw, any of various kinds of pipings for transport of a corrosive gas or a corrosive product, and a bit of an excavator.

* * * * *